UNITED STATES PATENT OFFICE.

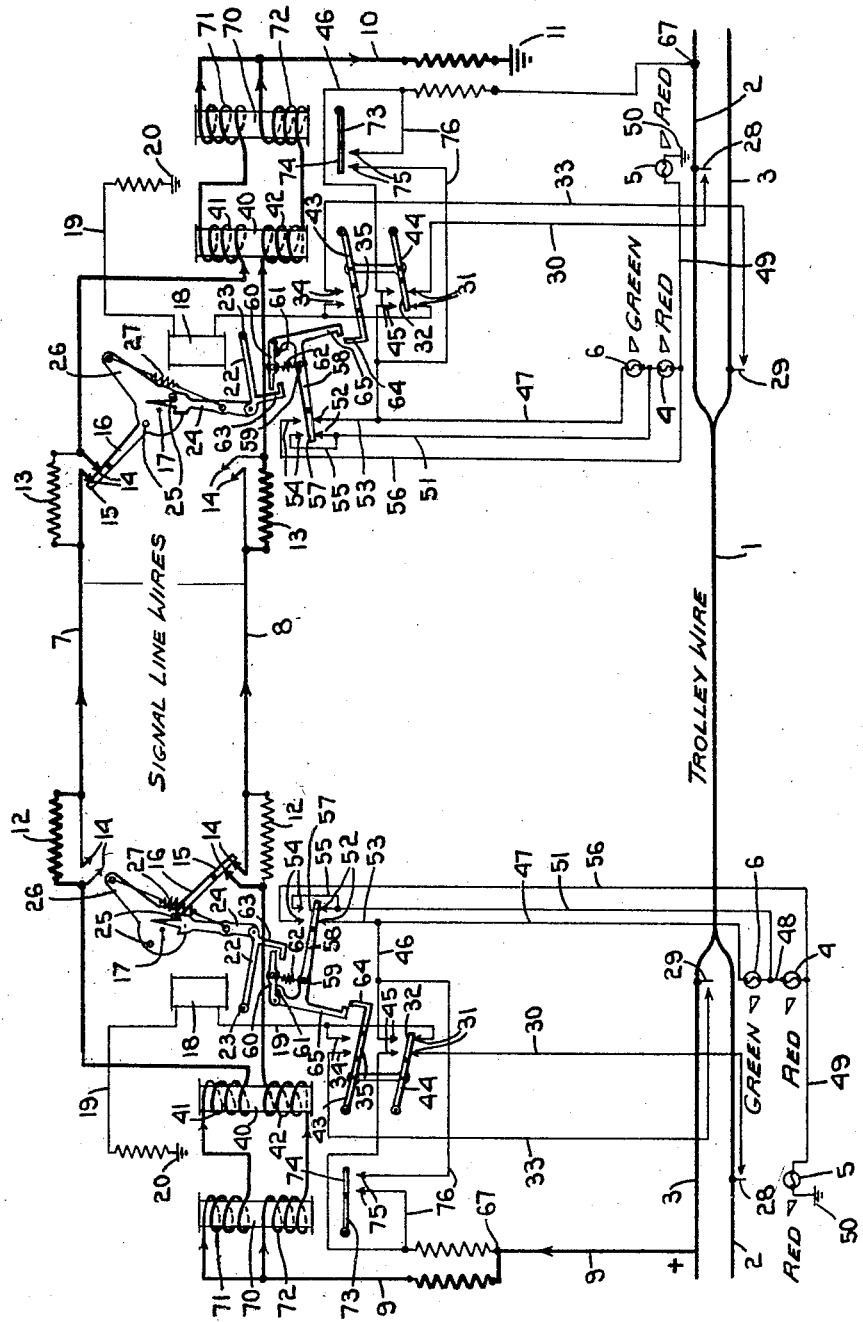
J. J. RUDDICK.
BLOCK SIGNAL SYSTEM.
APPLICATION FILED MAR. 14, 1919.
1,336,486. Patented Apr. 13, 1920.
Inventor.
John J. Ruddick
by Heard Smith & Tennant
Attys.

JOHN J. RUDDICK, OF NEWTON, MASSACHUSETTS.

BLOCK-SIGNAL SYSTEM.

1,336,486.   Specification of Letters Patent.   Patented Apr. 13, 1920.

Application filed March 14, 1919. Serial No. 282,671.

*To all whom it may concern:*

Be it known that I, JOHN J. RUDDICK, a citizen of the United States, residing at Newton, county of Middlesex, State of Massachusetts, have invented an Improvement in Block-Signal Systems, of which the following description, in connection with the accompanying drawing, is a specification, like characters on the drawing representing like parts.

This invention relates to block signal systems such as are used in connection with electric street car lines, and it has for its general object to provide a block signal system having a novel means for operating the signals and for causing the signals to indicate danger in case any abnormal conditions arise, such, for instance, as the grounding of a wire, breaking of a circuit, etc.

In my improved signal system I employ two parallel connected signal-controlling circuits which extend the length of the block and which are normally balanced, and have also provided signal-actuating means which is rendered operative whenever the two circuits become unbalanced. Suitable means are also provided for unbalancing the parallel-connected circuits whenever a car enters the block and for throwing them back into balance again whenever a car leaves the block.

In order to give an understanding of my invention, I have illustrated in the drawing a selected embodiment thereof which will now be described, after which the novel features will be pointed out in the appended claims.

The drawings show the signal system in its normal condition when there are no cars in the block.

1 indicates the trolley wire which is shown as provided at each end with a turn-out, each turn-out having the entering branch 2 and the exit branch 3. The distance between the turn-outs represents a block. At each end of the block there are suitable signals which may conveniently be in the form of colored lights. In the construction shown I have illustrated two red lights 4 and 5 at each end of the block and a green light 6, the two red lights 4 and 5 being separated somewhat from each other. The signal lights at each end of the block are in a normally-open signal circuit which will be presently referred to, and novel means are provided for closing this circuit when a car enters the block.

Extending the length of the block are two signal line wires or signal-controlling circuits 7 and 8 which are connected in parallel and are normally balanced. These normally-balanced controlling circuits have such a relation to the signal circuits at the ends of the block that whenever the controlling circuits become unbalanced the signal circuits will be closed thereby to display the signal. Suitable means are also provided for unbalancing these controlling circuits whenever a car enters the block from either end. The signal-controlling circuits 7 and 8 are connected at one end to a common feed 9 which may conveniently lead to and take its current from the trolley wire, and at their other end are connected to a common return 10 which is shown as being grounded at 11.

Each signal-controlling circuit has two equal resistances 12 and 13 connected thereto and each resistance has a pair of contacts 14 associated therewith which are so arranged that when the contacts are closed, the corresponding resistance will be shunted out of the circuit. Under normal conditions one resistance will be cut out of each circuit so that each circuit will have the same resistance and consequently the two circuits will be balanced.

Each of the two pairs of contacts 14 at each end of the block is adapted to be closed by a bridging contact 15 which is carried by but insulated from a swinging arm 16 pivoted at 17, the construction being such that as the arm 16 swings about its pivot 17, the bridging contact 15 will be carried from one pair of contacts 14 to the other. This swinging movement of the arm 16, therefore, will operate to cut the resistance into one circuit and shunt it out of the other circuit. Under normal conditions when no cars occupy the block, the arms 16 will be as shown in the drawing so that there will be one resistance shunted out of each of the circuits.

Whenever a car enters the block, then the arm 16 at the entering end of the block will be shifted from one controlling circuit to the other thereby to throw resistance in one circuit and shunt it out of the other circuit, thus operating to unbalance the circuits.

For accomplishing this, I provide a signal-actuating magnet 18 which is connected in a circuit 19 that is grounded at one end, as at 20, and at the other end leads to a suitable trolley switch 28 so that the passage of a trolley car over said switch will energize the magnet. The armature of the magnet, which is shown at 22, is pivoted at 23 and has connected thereto at one end an actuating device 24 which is adapted to engage one or the other of two pins 25 extending from the arm 16 and thereby swing the arm about its pivot. The arm 16 has an extension 26 and a spring 27 connects the extension to the actuator 24.

When the actuator and associated parts are in the position shown at the left, in the drawing then the energizing of the magnet 18 will raise the armature 22 and cause the actuator 24 to engage the right-hand pin 25 (said actuator being held in engagement with the pin by the spring 27) thereby to swing the arm 16 upwardly and carry the contact 15 from the pair of contacts in the circuit 8 to those in the circuit 7. During this swinging movement of the arm 16, the extension 26 will pass across the upper center so that when the armature 22 returns to its normal position the actuator 24 is brought into engagement with the other pin 25. When the armature 22 is again raised, therefore, the lever 16 will be swung backwardly into the position shown in the drawings.

There is a trolley switch shown at 28 in the entering branch 2 of the turn-out, and another trolley switch shown at 29 in the exit branch of the turn-out. The trolley switch 28 is connected by a wire 30 to the circuit 19, said wire having the contacts 31 therein which are normally closed by the bridging contact 32. The trolley switch 29 in the exit branch of the turn-out is connected by a wire 33 to the signal circuit 19, said wire having the contacts 34 therein which are normally open but are adapted to be bridged by the bridging contact 35.

Thus when a car enters the block from either end, the magnet 18 will be energized thereby unbalancing the two signal-controlling circuits 7 and 8. The unbalancing of these circuits operates to close the signal circuits through the signals at both ends of the block, thereby setting the signals. At the entering end of the block the signals will be set to display the green light 6 and the red light 5, while at the opposite end of the block the two red lights will be displayed.

The signal circuit leading to the green light 6 at each end of the block comprises the wire 46 connected to the feed at 67, and the wire 47 leading to the green light 6. The wire 46 is provided with two contacts 45 therein which are normally open, but which are adapted to be closed by the bridging contact 32 when the latter is raised off from the contacts 31.

The unbalancing of the signal-controlling circuits 7 and 8 operates to raise the bridging contacts 32 at both ends of the block into engagement with the contacts 45, thus closing both signal circuits. This control of the bridging contacts 32 is secured by means of two magnets 40, each of which is provided with two opposed windings 41 and 42, one in each of the circuits 7 and 8. Hence so long as the circuits 7 and 8 are balanced, the two windings of each magnet will neutralize each other and the magnets 40 will be inactive. Each magnet 40 is provided with an armature 43 to which is connected a swinging member 44 supporting the insulated bridging contact 32. The armature 43 carries the insulated bridging contact 35. Hence whenever the controlling circuits 7 and 8 become unbalanced, one of the windings on each magnet 40 will predominate over the other thereby raising the armature 43 and contact 32 and closing the contacts 45 and 34 at both ends of the block.

The signal circuit 46 at each end of the block will thus be closed.

As stated above, I have provided a construction whereby when the signal circuits are closed, the green light 6 and red light 5 will be exhibited at the entering end of the block while the two red lights only will be exhibited at the opposite end of the block. This is accomplished by providing a pair of contacts 52, one of which is connected by a wire 53 with the signal circuit 46, and the other of which is connected by a wire 51 to the two lamps 4 and 6, and also providing a second pair of contacts 54, one of which is connected to the wire 51 by the wire 55 and the other of which is connected by the wire 56 to the common return 49 that extends to the red light 5 and is grounded at 50. The contacts 52 and 54 are controlled by a bridging contact 57 which is carried by but insulated from a lever 58 that is pivoted at 59. This lever has a latch 60 pivotally mounted thereon which is normally held against a stop 61 by means of a spring 62, said latch being adapted to be engaged by a foot portion 63 depending from the armature 22.

When the parts are in normal position the contact 57 at each end of the block engages the contacts 52 and thereby shunt the green light out of the signal circuit. As a result, so long as the bridging contacts 57 close the contacts 52, the closing of the signal circuit at the contacts 45 will cause the red lights 4 and 5 only to be displayed, each signal circuit then being as follows: 67, wire 46, wire 53, contacts 52, wire 51, red light 4, wire 49, red light 5 to the ground. If, however, the bridging contact at either end of the block is raised to close the contacts 54, then the red light 4 will be shunted out of the circuit and the signal circuit will be constituted as follows: 67, wire 46, wire 47, green light 6, wire 51, contacts 54, wires 56, 49, red light 5, and to the ground.

Whenever either signal-actuating magnet 18 is energized by a car entering the block, the upward movement of the armature 22 will raise the lever 58 thereby closing the contacts 54 so that at the entering end of the block the green light 6 and red light 5 will be displayed. At the opposite end of the block the magnet 18 is not energized so that the contacts 52 will remain closed whereby the green light is shunted out of the signaling circuit. Hence at the entering end of the block the green light 6 and red light 5 will be displayed while at the opposite end of the block the two red lights 4 and 5 will be displayed.

I have provided means for locking the lever 58 from movement so long as the signal-controlling circuits remain unbalanced so that the signals will continue to be displayed. This is accomplished by providing the armature 43 at each end of the block with a locking finger 64 which when the armature is raised passes either in front of or behind an extension 65 depending from the lever 58. If it be assumed that a car enters the block from the left-hand end, then the energizing of the left-hand magnet 18 will raise the lever 58 at the left-hand end and the unbalancing of the signal-controlling circuits 7 and 8 will raise the armature 43. This upward movement of the armature 43 occurs just after the lever 58 has swung upwardly so that the locking finger 64 will pass in at the left of the extension 65. So long as the controlling circuits remain unbalanced, this locking finger will hold the lever 58 raised and the contacts 54 closed. At the opposite end of the block the locking finger will pass upwardly on the left-hand side of the extension 65, thus holding the contacts 52 closed. The signals will thus continue to be displayed so long as the signal-controlling circuits remain unbalanced.

When the car passes out of the block at the right-hand end, the signal-controlling circuits are again balanced, for as the trolley of the car engages the trolley switch 29, the magnet 18 at the exit end of the block will be energized, it being remembered that the contacts 34 are closed by the bridging contact 35. As the magnet 18 is energized, its armature 22 is given an upward impulse thereby to swing the arm 16 at the right-hand end of the block downwardly so as to open the contacts 14 in the signal-controlling circuit 7 and close those in the circuit 8. This restores the balance in the two circuits and the magnets 40 at both ends of the block become deënergized so that the armature 43 at both ends will fall. This results in opening the signal circuits so that the signals are returned to normal.

At each end of the block is another magnet 70 having two windings 71, 72 which are in the two controlling circuits 7 and 8. These two windings are in the same direction and hence they augment each other. As a consequence, the magnet 70 at each end of the block is energized by the current flowing in each of the signal-controlling circuits 7 and 8. Each magnet 70 controls an armature 73 which carries an insulated bridging contact 74 adapted to close two contacts 75 in a branch circuit 76, one end of which connects to the feed and the other end of which connects to the signal wire 46, said branch circuit being shunted around the contacts 45. The purpose of this construction is to provide means for causing the signals to be displayed in case both signal-controlling wires 7 and 8 become broken or current ceases to flow through them. Whenever this happens the armature 73 will drop so as to close the signal circuit through the shunt circuit 76.

The magnet 70 and its armature 73 also operate to maintain the signal circuits closed in case an abnormal condition arises in which the magnet 40 is shunted out of the circuit to such an extent as to render it inoperative to hold its armature 43 raised. In such event the contact 74 closes the signal circuit through the contact 75 so that the signal lights will continue to be displayed.

The signals will thus be displayed whenever the signal-controlling circuits 7 and 8 become unbalanced or whenever current ceases to flow in them, and hence if any abnormal conditions occur which tend to unbalance these circuits, the signals will be displayed so as to indicate such fact.

I claim:

1. In a block signal system, the combination with two parallel-connected normally-balanced signal-controlling circuits, of means to unbalance said circuits as a car enters the block, a signal circuit, and means rendered operative when said controlling circuits are unbalanced to close the signal circuit.

2. In a block signal system, the combination with two parallel-connected normally-balanced signal-controlling circuits, of means to unbalance said circuits as a car enters the block, a signal circuit at each end of the block, means rendered operative when said controlling circuits are unbalanced to close the signal circuits, and a signal for each signal circuit.

3. In a block signal system, the combination with two parallel-connected normally-balanced signal-controlling circuits, means to unbalance said circuits when a car enters the block from either end, a normally-open signal circuit at each end of the block, a signal in each circuit, and means rendered operative when said controlling circuits are unbalanced to close the signal circuits.

4. In a block signal system, the combination with two parallel-connected normally-balanced signal-controlling circuits, of means to unbalance said circuits when a car enters the block, a normally-inoperative signal circuit, means to render said signal circuit operative by the unbalancing of said controlling circuits, and means operated by a car leaving the block to restore the balance between said controlling circuits.

5. In a block signal system, the combination with two parallel-connected normally-balanced signal-controlling circuits, of means to unbalance said circuits when a car enters the block from either end, a normally-inoperative signal circuit at each end of the block, means rendered operative when said controlling circuits are unbalanced to render the signal circuits operative, and means to restore the balance between said controlling circuits when a car leaves the block from either end.

6. In a block signal system, the combination with two parallel-connected normally-balanced signal-controlling circuits, of a normally-open signal circuit, a magnet for controlling said circuit, said magnet being connected to the controlling circuits and normally held inoperative thereby but becoming operative when the controlling circuits are unbalanced, and means to unbalance the controlling circuits by a car entering the block.

7. In a block signal system, the combination with two parallel-connected normally-balanced signal-controlling circuits, of a normally-open signal circuit, a magnet for controlling said circuit, said magnet being connected to the controlling circuits and normally held inoperative thereby but becoming operative when the controlling circuits are unbalanced, and means to unbalance the controlling circuits by a car entering the block and to restore the balance of said circuits by a car leaving the block.

8. In a block signal system, the combination with two parallel-connected normally-balanced signal-controlling circuits, of a normally-open signal circuit at each end of the block, a magnet at each end of the block adapted when energized to close the corresponding signal circuit, said magnets being connected with both signal-controlling circuits and held normally inoperative when said circuits are in their balanced relation but becoming operative when the circuits are unbalanced, and means operated by a car entering the block from either end to unbalance said controlling circuits.

9. In a block signal system, the combination with two parallel-connected normally-balanced signal-controlling circuits, of a normally-open signal circuit at each end of the block, a magnet at each end of the block adapted when energized to close the corresponding signal circuit, said magnets being connected with both signal-controlling circuits and held normally inoperative when said circuits are in their balanced relation but becoming operative when the circuits are unbalanced, means operated by a car entering the block from either end to unbalance said controlling circuits, and means to restore the balance of said circuits when a car leaves the block.

In testimony whereof, I have signed my name to this specification.

JOHN J. RUDDICK.